C. E. MITCHELL.
CHUCK JAW.
APPLICATION FILED FEB. 8, 1911.
1,011,227.
Patented Dec. 12, 1911.
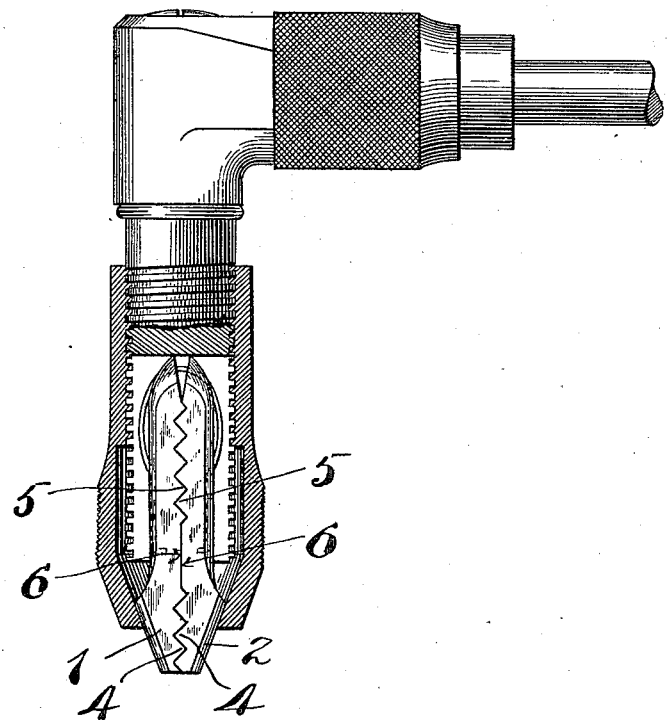
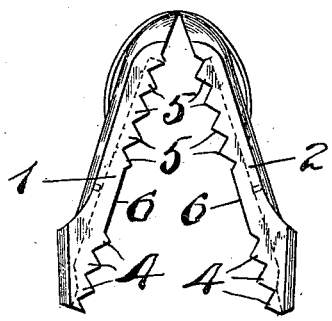
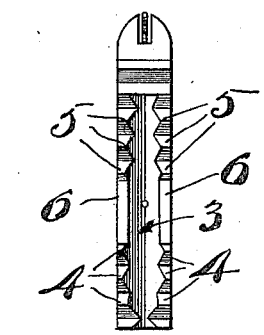
Witnesses:
Fred'k M. Dammenfelser
Chas. A. Peard
Inventor
C. E. MITCHELL
By his Attorneys

UNITED STATES PATENT OFFICE.

CHARLES E. MITCHELL, OF NEW BRITAIN, CONNECTICUT, ASSIGNOR TO STANLEY RULE AND LEVEL COMPANY, OF NEW BRITAIN, CONNECTICUT, A CORPORATION OF CONNECTICUT.

CHUCK-JAW.

1,011,227.  Specification of Letters Patent.  Patented Dec. 12, 1911.

Application filed February 8, 1911. Serial No. 607,424.

*To all whom it may concern:*

Be it known that I, CHARLES E. MITCHELL, a citizen of the United States, residing at New Britain, Hartford county, State of Connecticut, have invented certain new and useful Improvements in Chuck-Jaws, of which the following is a full, clear, and exact description.

My invention relates to improvements in chuck jaws of the type usually employed in bit braces.

The main object of the invention is to substantially increase the strength of such jaws and improve the gripping function thereof. Furthermore, by this improved construction, which affords maximum strength, each jaw piece may be made substantially lighter than heretofore without danger of breakage.

In the drawings, Figure 1 is a side elevation of the chuck portion of a bit brace shown partly in section and illustrating the jaws as they appear in place and closed. Fig. 2 is a side elevation of the chuck jaws expanded or open. Fig. 3 is a view of the inside of one of said jaws.

1—2 represent two companion jaw pieces arranged to embrace and hold between them a tool having either a round shank or the usual angular bit shank. To adapt chuck jaws of the type described so as to properly grip both kinds of tool shanks referred to, it has heretofore been common to provide each jaw with not only a longitudinal clearance groove to receive the angular jaw, but also a series of intermeshing teeth extending along each edge of the groove the full length thereof, said teeth providing a multitude of points to grip the tool having a round shank with that degree of force required to prevent turning. Such jaws have been found to be weak at points intermediate the length thereof, and indeed, so weak that at such points breakage frequently occurs. It is my aim to provide a construction which will add strength to this weak part of the jaw without materially lessening the gripping power thereof.

Now referring to the drawings, it will be seen that each jaw member is provided with a central longitudinal groove 3. Each jaw member is likewise provided with a relatively short series of teeth on each side of said groove near the forward end as at 4—4. Each jaw member is also provided with a relatively short series of teeth 5—5 at its rear end. Between the series of teeth 4—4 and 5—5 is a straight untoothed or solid portion 6 of a height, measured from the bottom of the groove, reaching approximately to one-half the height of the teeth at each end thereof. This untoothed or solid portion bridges, and thereby strengthens, the weakest part of the jaw to such an extent that danger of breakage is practically eliminated. I have found that by this construction there are still a sufficient number of points provided for gripping a round tool shank to guarantee a secure holding thereof. My improved construction, in which two sets of spaced teeth are employed, provides another advantage, namely, by this arrangement it is guaranteed that the tool shank will be gripped at two spaced intervals, thereby guaranteeing the proper alinement of the bit or drill having the round shank, and likewise holding the same rigidly in its straight line position, whereas, if the series of teeth extended the full length of each chuck jaw, there might be danger that some of the middle teeth would engage the tool and thereby hold the same only in an unsteady manner. This danger is eliminated in the present case by omitting the teeth at the middle section and causing said middle section to lie below the plane of the top of the teeth at each end thereof.

What I claim is:

1. A chuck jaw having a longitudinal groove in the inner face thereof with a series of teeth at opposite sides of, and at one end of, said groove, another series of teeth at opposite sides of, and at the other end of, said groove, and an untoothed section separating said two series of teeth, said untoothed section bridging the weakest part of said jaw and being at an elevation of substantially one-half the height of said teeth.

2. A chuck jaw having a longitudinal groove in the inner face thereof with a series of teeth at opposite sides of, and at one end of, said groove, another series of teeth at opposite sides of, and at the other end of, said groove, and an untoothed section separating said two series of teeth, said untoothed section bridging the weakest part of said jaw and being located in a plane below the tops of the teeth at each end thereof.

3. A chuck jaw having a longitudinal groove in the inner face thereof, with a series of teeth at opposite sides and at one end of said groove, another series of teeth at the opposite side of and at the other end of said groove, and an untoothed section separating said two series of teeth, said longitudinal groove being deepest in the zone of said untoothed section, the surface of the untoothed section being in a plane substantially midway in the height of said teeth.

CHARLES E. MITCHELL.

Witnesses:
CHAS. B. STANLEY,
W. J. WORAM.

Copies of this patent may be obtained for five cents each, by addressing the "Commissioner of Patents, Washington, D. C."